United States Patent [19]

Charas

[11] Patent Number: 5,613,225
[45] Date of Patent: Mar. 18, 1997

[54] RADIO MODULE INCLUDED IN A PRIMARY RADIO STATION, AND A RADIO STRUCTURE CONTAINING SUCH MODULES

[75] Inventor: Philippe Charas, Upplands Vasby, Sweden

[73] Assignee: Telefonaktiebolaget LM Ericsson, Stockholm, Sweden

[21] Appl. No.: 149,532

[22] Filed: Nov. 9, 1993

[30] Foreign Application Priority Data

Nov. 9, 1992 [SE] Sweden ................................. 9203335

[51] Int. Cl.⁶ ........................................................ H04B 1/03
[52] U.S. Cl. ........................ 455/103; 455/128; 455/129; 455/300; 343/853
[58] Field of Search ...................... 343/700 MS File, 343/853; 361/816, 818, 730, 66; 455/56.1, 89, 90, 106, 103, 101, 128, 129, 346, 347, 349, 300

[56] References Cited

U.S. PATENT DOCUMENTS

| | | | |
|---|---|---|---|
| 4,342,002 | 7/1982 | Gabr | 361/730 |
| 4,392,242 | 7/1983 | Kai . | |
| 4,680,591 | 7/1987 | Axford et al. | 343/853 |
| 4,694,484 | 9/1987 | Atkinson et al. . | |
| 4,716,493 | 12/1987 | Zelkowitz | 361/876 |
| 4,719,530 | 1/1988 | Berdanos | 361/66 |
| 4,837,858 | 6/1989 | Ablay | 455/17 |
| 4,868,890 | 9/1989 | Lennartsson . | |
| 4,933,680 | 6/1990 | Shapiro et al. | 343/853 |
| 4,987,425 | 1/1991 | Zahn et al. | 343/853 |
| 5,019,829 | 5/1991 | Heckman et al. | 343/853 |
| 5,099,254 | 3/1992 | Tsukii et al. | 343/853 |
| 5,126,705 | 6/1992 | Carnevali et al. | 343/853 |
| 5,175,878 | 12/1992 | Davis et al. | 455/103 |
| 5,216,435 | 6/1993 | Herata et al. | 343/853 |
| 5,327,152 | 7/1994 | Kruger et al. | 343/853 |
| 5,369,552 | 1/1994 | Barnes et al. | 361/816 |
| 5,382,959 | 1/1995 | Pette et al. | 343/700 MS |

FOREIGN PATENT DOCUMENTS

0439936A2  8/1991  European Pat. Off. .

Primary Examiner—Andrew Faile
Attorney, Agent, or Firm—Burns, Doane, Swecker & Mathis, L.L.P.

[57] ABSTRACT

A radio module for a radio base station of a mobile radio system which transmits and receives radio signals from stationary or moving mobile radio stations over given frequencies. A module comprises an antenna part and a transceiver part of given mechanical construction. Each module of a base station transmits and receives over a given specific frequency which may be different when transmitting and receiving but which is not the same frequency as that used by any other module in the station. A radio base structure is comprised of a plurality of modules, each having its own specific or individual transmitting and receiving frequency and being provided with suppression means which prevent a module from disturbing neighboring modules. A radio base structure having diversity reception is also provided.

14 Claims, 4 Drawing Sheets

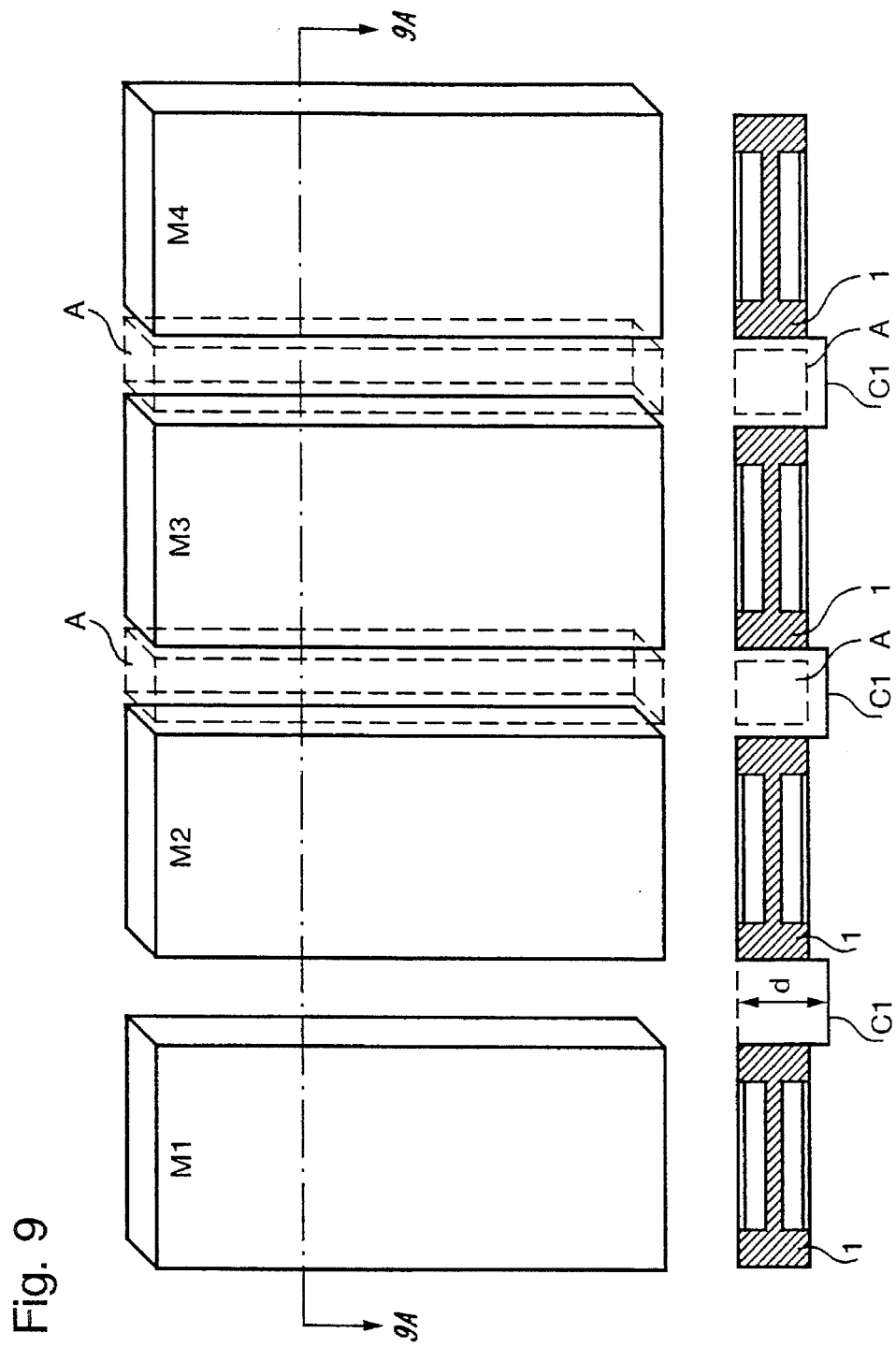

RADIO MODULE INCLUDED IN A PRIMARY RADIO STATION, AND A RADIO STRUCTURE CONTAINING SUCH MODULES

TECHNICAL FIELD

The present invention relates to a radio module which is included in a primary radio station of a mobile radio system. The primary radio station may be a base station of a mobile telephone system for instance, although it may also form part of a mobile services switching centre having integrated transmitter-receiver units. The invention also relates to a primary radio station that is constructed from a number of such modules, said modules being mutually independent and functioning as separate autonomous base stations in the main primary station.

BACKGROUND ART

A radio subsystem of a mobile radio system is generally comprised of one or more radio signal transceivers TRX, an antenna part which is common to several transceivers, and a control part. The transceivers include the radio technical units, such as modulator/demodulator, frequency synthesizer, and amplifier units, while the control part includes those controlling and switching devices required to operate the transceivers and to divert calls to/from the mobile services switching centre (MSC) of the system.

Those digital TDMA-systems developed in recent times in Europe and North America also include units for channel coding and decoding in conjunction with transmission and reception, time-slot allocation (e.g., burst generators) and recovery of data from a given time-slot (e.g., symbol detectors, and possibly also equalizers) and speech coding and speech decoding units. In these digital systems, the aforesaid units are controlled by the control unit when transmitting and receiving signals on the basis of then allocated channels. Consider, for instance, that the frequency synthesizer must be tuned to the correct receiving frequency. This means that both frequency and time slot allocation must be controlled in the transceiver units. Furthermore, it is necessary to be able to control the burst generator and the symbol detector in the receiver so as to enable the signal burst intended for a given channel to be recovered from the time-slot determined.

The base station may contain several such transceiver units and one such given unit need not be allocated a given radio channel or other radio parameter (time-slot, frequency, power output, etc.), but can be controlled generally by the control unit to transmit/receive on all of the radio channels allocated to the base station.

Each base station of a cellular system may be allocated a particular set of radio channels and a given radio coverage in a given cell or several sector cells. It is generally known to use a single antenna unit for a plurality of transceiver units within a base station. The individual transmitter units may be connected to the common antenna via coaxial connections and a so-called filter combiner or hybrid combiner.

In other cases, a high linear amplifier intended for a plurality of carrier frequencies is used prior to delivering signals to the antenna via a coaxial connection.

Although this enables the antenna construction of the base station to be simplified, it also results in unnecessary power consumption, since it is necessary to compensate for attenuation of the radio signal caused by the coaxial connection and the combiner with greater power in the output amplifier of the transmitter part. In the other case, which uses a high linear amplifier without a combiner, significant power losses are experienced not only in the coaxial connection but also in the amplifier. Furthermore, the use of a filter combiner, which has lower losses than a hybrid combiner, has, instead, the disadvantage of not permitting any desired frequency combination to be used in the transmitter, because the filters must be designed to be selective for a given transmitter frequency.

The inclusion of transceiver modules in a radio base station has earlier been proposed; see for instance U.S. Pat. No. 4,694,484. Each such module is assigned unique parameters with regard to its function in the radio system, depending on the location of these transceivers and the antenna configuration used.

The radio system described in the aforesaid patent is an FDMA-system in which a channel corresponds to a specific radio frequency. The system also includes a fixed antenna unit comprised of sector antennas each illuminating a cell, and associated combiners (cavities 610–614, FIG. 6). A number of such modules in a base station can be controlled by the base station controller so as to transmit/receive over certain radio channels and in accordance with those requirements demanded by the antenna unit in the base station. The module can be controlled so as to be operative for both transmission and reception of radio calls, which is the most usual mode of operation, or solely to receive and page radio signals. This known structure is able to reduce greatly the number of complicated connections between the different base station units, although the disadvantage of needing to adapt the individual modules to the demands of the antenna unit still remains.

DISCLOSURE OF THE INVENTION

The development of cellular land mobile radio systems in recent years has been influenced in arriving at the present invention. Older cellular radio systems of this kind generally comprise larger cells, require high power outputs from the base stations, and have relatively few channels/base stations. The majority of the older systems are analog systems.

Present-day cellular radio systems and those systems developed in recent times are characterized by small and large cells (micro-cells, umbrella cells), lower power outputs, many channels and higher frequencies. The recent systems are also often digital systems with time-division multiplex access (TDMA).

An object of the present invention is to provide a radio module for a base station of a mobile radio system and a structure of such a module where the modules are autonomous and can be mutually arranged so as to be able to fulfil their functions independent of one another, thereby better adapting the structure to present-day radio systems and anticipated future radio systems.

The term "present-day radio systems" primarily refers to the FDMA (single carrier frequency) and TDMA (single carrier frequency/time slot) systems mentioned in the introduction. But a radio module according to the present invention can also be applied on a radio system of the so called CDMA-type in which the radio signals are modulated and transmitted/received within a broad frequency band (spread spectrum).

Another object of the present invention is to provide a module structure which will improve efficiency and eliminate the need of combiners and associated cabling to the combiners from the various transmitter units.

The properties of the proposed radio structure and the modules included therein enable the requirements placed on present-day systems to be satisfied to a greater extent. Primarily, the need for combiners and associated coaxial cables is eliminated. In those cases when combiners are not used but a power consuming high-linear final amplifier is used, the proposed modular structure enables the final amplifier to be made more simple and leaner in power. The inventive radio structure is particularly suitable in those cases in which the antennas can be given small dimensions in systems which use very high frequencies (in the order of 1500 MHz).

BRIEF DESCRIPTION OF THE DRAWINGS

The invention will now be described in more detail with reference to the accompanying drawings, in which

FIG. 9 is a diagrammatic illustration of signal suppression between modules in the inventive structure.

FIG. 9A is a sectional view of FIG. 9.

BEST MODES OF CARRYING OUT THE INVENTION

Figure 1:
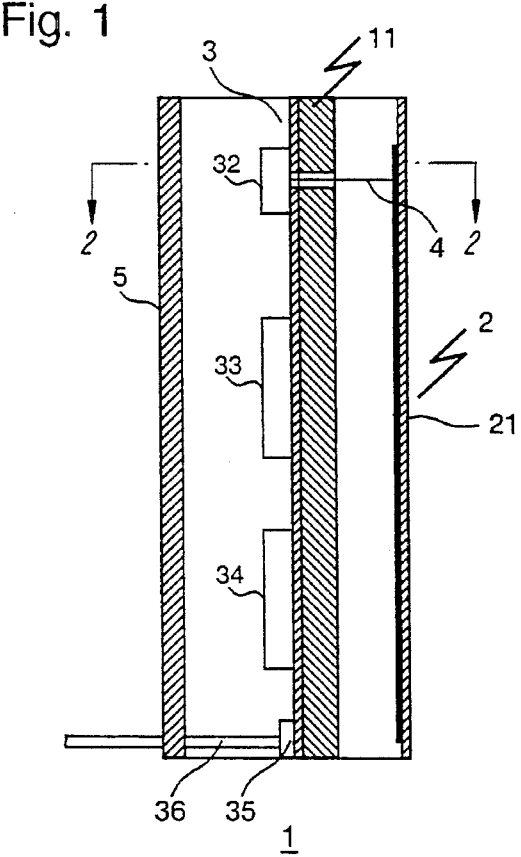
FIG. 1 is a sectioned side view of an inventive radio module.

FIG. 1 is a longitudinal sectioned view of an inventive radio module. The body of the actual module is comprised of a fixed profile 1 made of aluminium for instance and having an H-shaped cross-section (see FIG. 2). FIG. 1 also shows a longitudinal cross-section of the profile. In each of the thus formed longitudinally extending openings of the profile 1, there is attached or firmly clamped an antenna part 2 between the two side parts 12 and 13 of the profile 1 on one side thereof. The component part 3 of the transmitter-receiver units of the module is attached in a suitable manner to the other side of the profile 1 and along the web 11 of said profile. The component part 3 may be comprised of a flat, rectangular insulating plate, for instance a laminate on which blocks 33 and 34 containing the transceiver components are mounted. This is shown more clearly in FIG. 4. There may also be provided a component block 32, which represents a duplex filter and is mounted on the plate 31. Provided at the lower end-part of the component part 3 is a cable connection 35 by means of which the transceiver units are connected to external units, such as the control unit. This connection is suitably effected with a coaxial cable.

Figure 2:
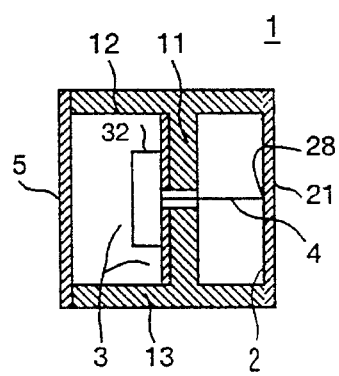
FIG. 2 is a cross-sectional view of the antenna module shown in FIG. 1.
Figure 3:
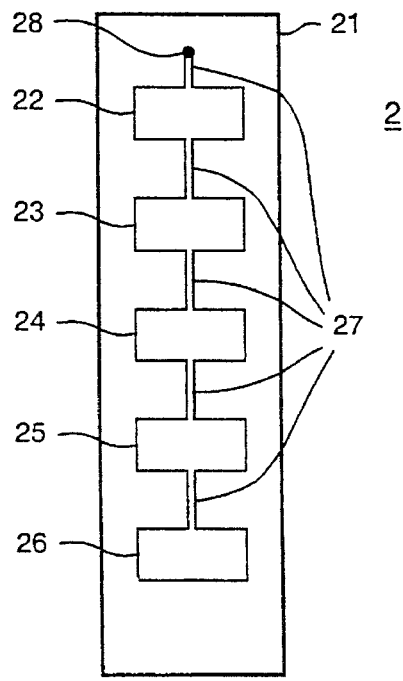
FIG. 3 illustrates the antenna side of the radio module shown in FIG. 1.

The antenna part 2 is comprised of a fiberglass board 21 provided with metal configurations that form the antenna dipoles, as shown in FIG. 3. The antenna board 21 is attached or firmly clamped between the two side parts 12 and 13 in a suitable manner. The space between the antenna board 21 and the web 11 may be filled with a soft, insulating material. The board 21 is mounted so that the metal patterned surface faces inwards towards the web 11 of the module, as shown in FIGS. 1 and 2.

FIG. 2 is a cross-sectional view of the radio module and shows the H-shaped profile 1 and also the antenna part 2 and the component part 3 of the transceiver units in their assembled states.

FIG. 3 illustrates the construction of the antenna part 2 in more detail. The antenna part preferably has the form of a known stripline antenna which includes a conductive pattern as described above in the form of a plurality of conductive plates 22–26 (five plates in the illustrated embodiment) which form the antenna dipoles and associated conductor layout 27. An electric contact 28 (see FIG. 1) is provided at the upper part of the antenna board 21. The antenna plates 22–26 are connected to the duplex filter 32 by means of an electric connection (naked wire) 4, via the electrical connection 28, and the duplex filter 32 is in turn connected to the transceiver units. The web 11 of the module may form the earth of the antenna unit and may also form the earth of the transceiver units 33 and 34.

When incoming radiation is received from a mobile station, for instance, electric voltages are induced in the plates 22–26 and the combined voltage (relative to the earth surface) is conducted from the plates through the electric contact 28, the electric connection 4 and the duplex unit 32 to the receiver block 34. Conversely, the transmitter signals are conducted from the transmitter block 33 to the plates 22–26, via the naked wire 4, the electrical contact 28 and the duplex unit 32.

Figure 4:
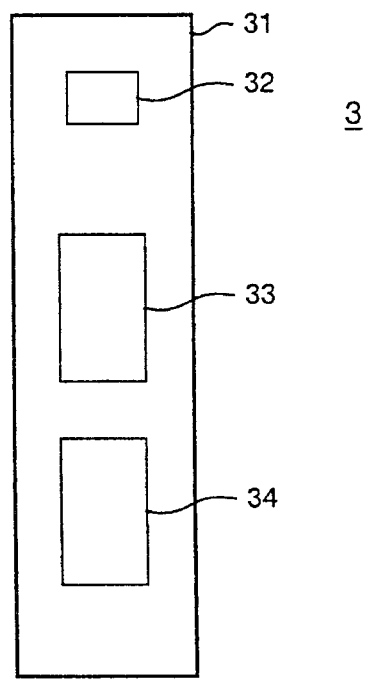
FIG. 4 illustrates the component side of the radio module shown in FIG. 1.

FIG. 4 illustrates the front side of the component part 3 containing the transmitter units 33 and the receiver units 34. These components are known components and are mounted on a circuit board 31 and connected in a known manner to produce the desired, known transceiver functions. In a preferred embodiment of the present invention, the antenna function, i.e. the antenna part 2, is integrated with the transceiver functions, i.e. the component part 3, to form a single unit. In the embodiment illustrated in FIGS. 1–2, these units have been constructed on an H-shaped profile, although it will be understood that the body, shown as profile 1 in FIG. 1, may have another profile and that the antenna and component parts can be attached or firmly clamped in some other way. A feature of the present invention is that a radio module will have its own antenna part which is connected to its own component part for the transceiver units (in the absence of a combiner), and that these parts are not common to any other radio module in a base station, and that the modules can be placed close together in a structure, as described below.

Figure 5:
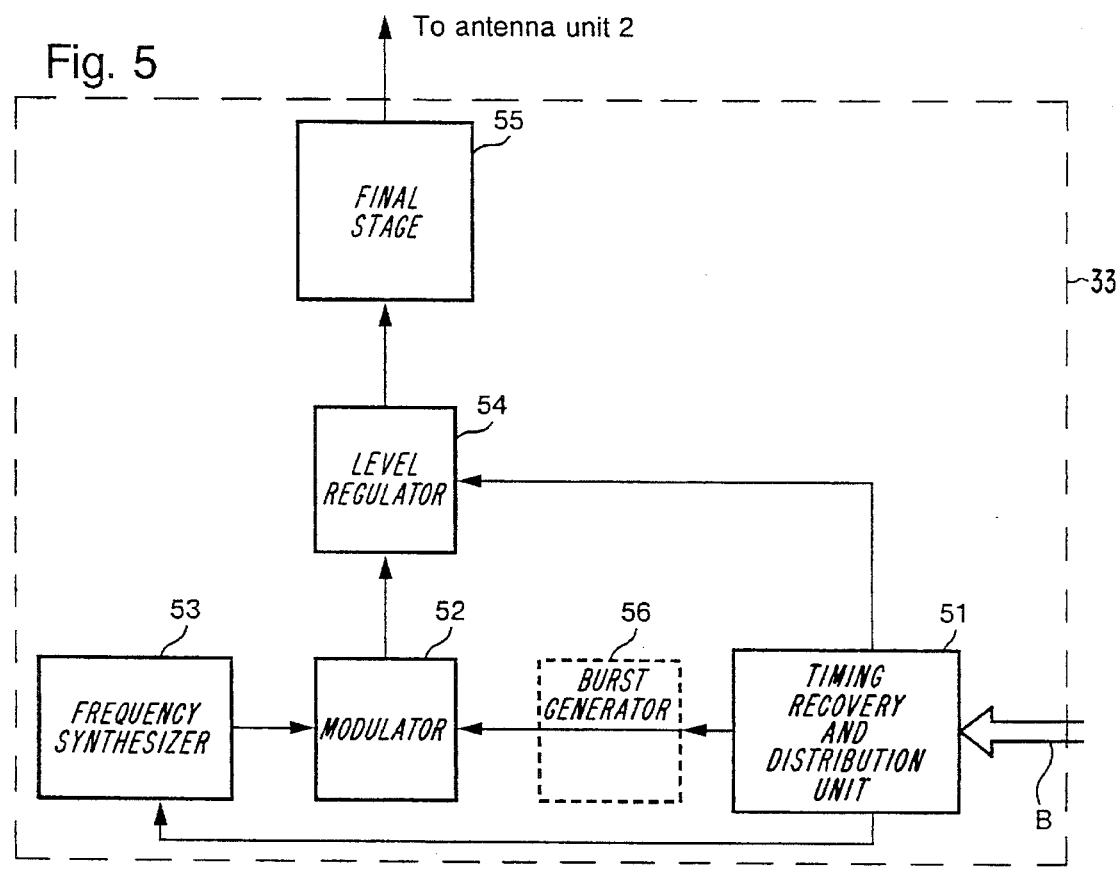
FIG. 5 is a block diagram of the transmitter units included in the module shown in FIG. 1.

FIG. 5 is a block diagram of a typical embodiment of the transmitter units in the block 33 included in a radio module according to the invention. All units in the module are in themselves known in the construction of a base station of a cellular mobile radio system.

Connected to the input B of the transmitter block, said input being connected to the electric contact device 35 in FIG. 1, is a unit 51 for timing recovery and distribution of those signals which arrive from the base station controller via the connection 36 in FIG. 1 and which are intended to control the various units in the transmitter block according to FIG. 5.

Thus, the unit 51 has a connection which leads control signals to a frequency synthesizer 53 which set or adjust the synthesizer to the radio frequency f1 used for the radio module. A modulator block 52 includes a modulator which modulates the baseband signals to a desired form, for instance a 4piQAM-modulator in the illustrated case. Control signals which control the function of this modulator and other units are also obtained over the input B. The block 52 also includes an RF-modulator, i.e. a frequency modulator, which transforms the baseband modulated signals to the desired radio frequency band. The chosen radio frequency f1 is delivered to the RF-modulator from the frequency synthesizer 53, controlled by the unit 51.

Further, control signals are sent from the unit 51 to a level regulator 54 with the intention of being able to regulate the level of the signals obtained from the RF-modulator in block 52 to the following final stage 55. The final stage 55 includes a power amplifier which delivers amplified radio signals having a given power output to the following antenna unit 2, via the connection 4 and the duplex filter 32 shown in FIG. 1.

One special feature of the transmitter unit 33 in an inventive radio module resides in the control of the frequency synthesizer 53 and the level regulator 54. When the module is included together with a plurality of other modules in an FDMA-system, the frequency synthesizer can be controlled in a desired manner, such that each radio module in the system has its own particular frequency, i.e. for an FDMA-system, each module has its own individual radio channel among a number of modules each having their own particularly selected radio channels. This will be described in more detail further on. (In prior art systems which utilize a combiner, selective setting of the radio frequency is prevented by the combiner.)

Control signals to the level regulator 54 from the base station controller for instance, control the setting or adjustment of the level of the output signals from the modulator unit 52, so that these signals will be adapted to the antenna unit 2 subsequent to being amplified in the final stage 55. The final stage 55 includes a power amplifier (not shown), as in the case of known final stages. Since no losses are occurred by the presence of a combiner or associated coaxial connection in the base station, there is no longer the same need for high amplification as in known designs.

When the radio system is a TDMA-system, certain additional units are included, among them the block 56 shown in broken lines in FIG. 5, which contains a burst generator for distributing the incoming baseband signals into given time-slots for each TDMA-frame.

Figure 6:
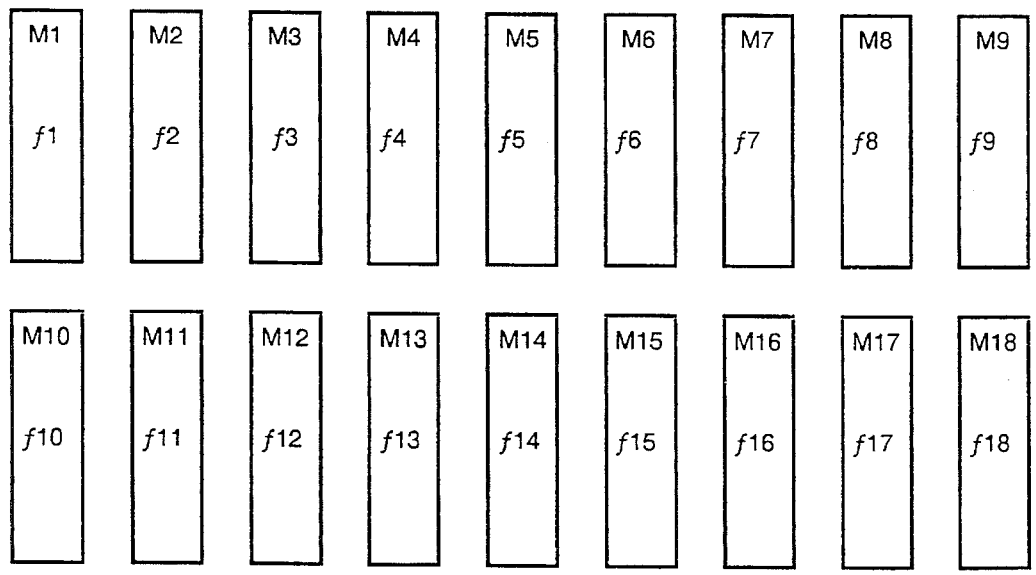
FIG. 6 illustrates schematically a general base station structure according to the present invention.

FIG. 6 illustrates an array of radio modules in a base station of a mobile radio system. The illustrated array includes a total of 18 modules, of which nine modules M1–M9 are arranged in the upper row and nine modules M10–M18 in the bottom row. All modules are mounted in a suitable manner and form the primary station (the base station). A general condition, irrespective of the type of system involved (FDMA or TDMA) is that modules M1–M8 and M11–M18 transmit on their own individual frequency f1–f8 and f11–f18 respectively and that no module is able to transmit on the same frequency as another module. The receiver unit 34 is removed from each of these modules and the duplex filter 32 is replaced with a strap. In the case of an FDMA-system, each module M1–M8 and M11–M18 transmits on a given carrier frequency that is different from the carrier frequency of each other module. The modules M9 and M10 are receiving modules and each one will thus include only one receiver amplifier according to FIG. 1. The receiving modules M9 and M10 are able to receive radio signals from secondary radio units over several carrier frequencies f9 and f10 respectively, although these carrier frequencies are spaced from the carrier frequencies on which the modules M1–M8 and M11–M18 transmit by a given duplex distance (for instance, 45 MHz).

Frequency jumping or hop is used in the GSM-system, i.e. the value f1 of the carrier frequency of a given transmitter on a given occasion will hop to another value f2 on another given occasion. When applied to the inventive module structure, the use of frequency hopping would mean that when the carrier frequency f1 is used by the module M1 and the carrier frequency f2 is used by the module M2 on a given occasion and module M1 hops from f1 to f2, it would then be necessary for the module M1 to hop at the same time to some other frequency that is not used by the structure. Frequency hopping can be effected from one time slot to another.

Those procedures that must be taken in order to ensure that the different modules M1–M18 will not disturb one another have not been shown in this Figure, but will be described in greater detail below with reference to FIG. 9.

Figure 7:
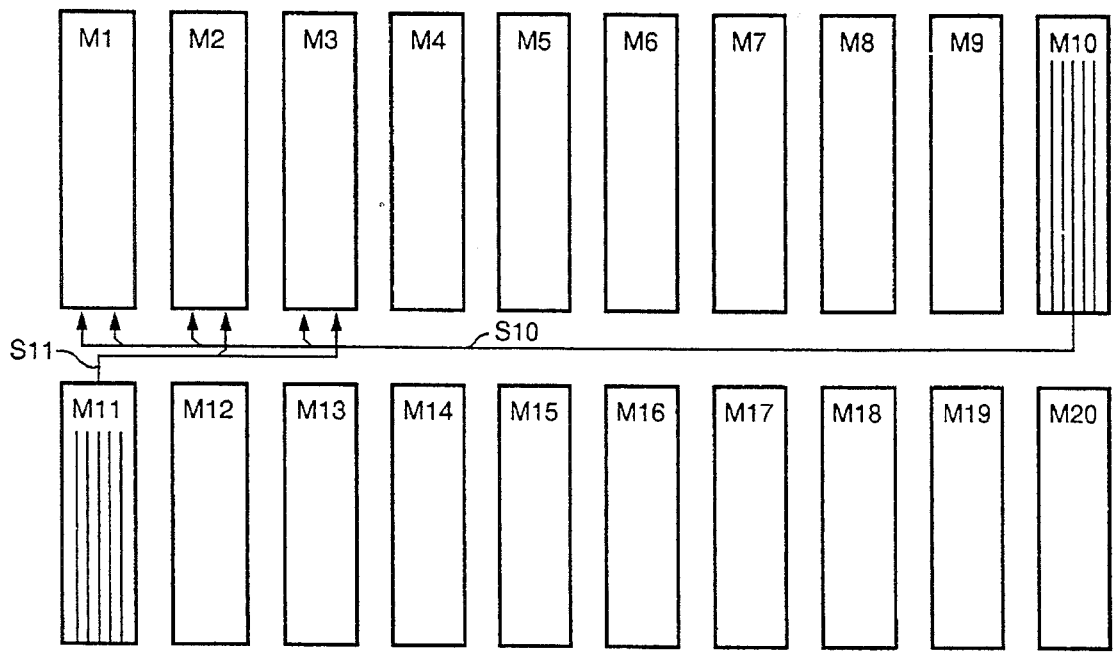
FIG. 7 illustrates a similar base station structure to FIG. 6, but with receiver diversity.

Another preferred embodiment is illustrated in FIG. 7. FIG. 7 illustrates an array of radio modules M1–M9, M12–M20 similar to the FIG. 6 array, with the exception that the FIG. 7 array includes two further modules M10, M11. These additional modules are included with the intention of achieving reception diversity, i.e. reception of radio signals from a given mobile radio at two mutually separate places in the base station. Diversity design of antennas and transceiver units is known to the art. Such designs include two antennas which are spaced apart in the radio receiver. The radio receiver may then either have two separate signal processing paths for the recovery of transmitted information (speech or data) or may have a common signal path which includes a switch to each antenna.

In the diversity design illustrated in FIG. 7, it is assumed that the modules M1–M9 and M12–M20 have both transmitter and receiver units and that the two modules M10 and M11 form only antenna modules. By way of example, it is assumed that only three standard modules M1, M2 and M3 are disposed for diversity reception. The antenna module M10 is connected to one receiving path of the modules M1, M2 and M3 by a coaxial connection S10, while the antenna module M11 is connected to the other receiving path of the modules M1, M2 and M3 by a coaxial connection S11. It is therewith possible to achieve diversity with two separate antenna pairs.

This opposes what has earlier been said with regard to the construction and function of the different modules in the earlier described embodiments. However, in the instant embodiment, two pairs of modules, for instance M1, M10 and M1, M11 can each be considered as a single receiving module having the same radio parameters (frequency and time-slot), but where the antenna part is divided into two parts, each positioned at a different geographical location.

Figure 8:
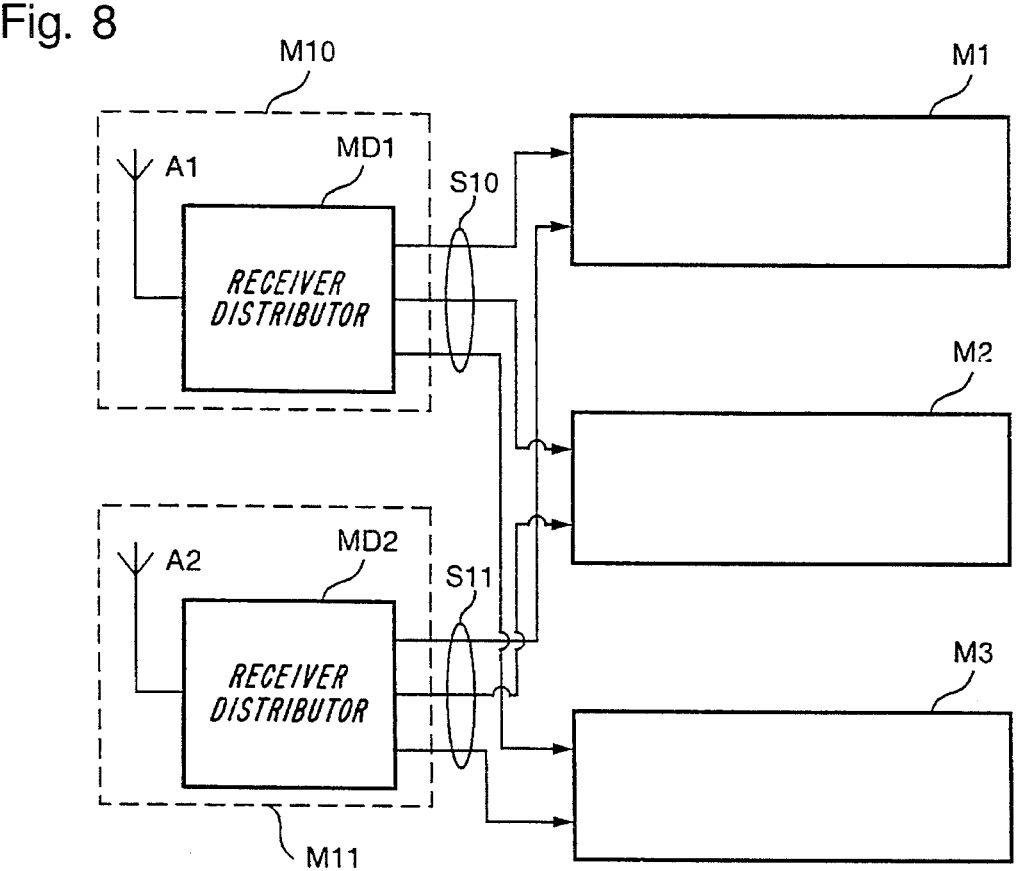
FIG. 8 is a block diagram which illustrates the receiver diversity in the base station structure of FIG. 7 in more detail.

FIG. 8 illustrates the diversity design of the three modules M1, M2 and M3 with associated antenna modules M10, M11 in more detail.

Each of the antenna modules M10, M11 is comprised of an antenna A1 and A2 and a receiver distributor MD1 and MD2 respectively. The antennas will preferably have the construction shown in FIGS. 1 and 3 and each of the receiver distributors MD1, MD2 is comprised of a resistive network, optionally including an amplifier. The antenna signal incoming from the antenna A1 in the module M10 for instance is divided into three generally equal signals, each corresponding to the antenna signal, and the three signals are passed to one receiving input of respective modules M1, M2, M3. Similarly, the antenna signal incoming from the antenna A2 in the module M11 is divided into three equal signals and the signals are passed to the other receiving input of the modules M1, M2, M3. Each such module will preferably have separate signal processing units and can be constructed as disclosed in the U.S. Pat. No. 4,868,890.

An analysis of the received signal is carried out in each module M1–M3, by means known in the art, such as those means described in the aforesaid U.S. patent, and the best signal contribution is recovered from the two parallel receiving circuits for further signal processing (channel decoding, etc.).

As will be understood, each module can function as a fully autonomous transmitter and receiver in which its own antenna is used both for transmitting and receiving signals. However, it is necessary in this case to provide a duplex filter between the antenna unit and the transmitter and receiver respectively in the module. This solution, however, does not provide the aforedescribed diversity effect.

Thus, the modules M1–M18 illustrated in FIGS. 6–8 can be combined selectively, provided that the requirement of different carrier frequencies on different modules is observed. Leakage between antenna elements in one module to another module, via radiation and earth currents from the antenna in one module to an adjacent module and capable of causing intermodulation, can be suppressed in the manner described below.

This suppression can be achieved with the aid of three mutually independent procedures capable of reducing leakage between two mutually adjacent modules, and therewith intermodulation, either together or individually.

FIG. 9 illustrates an example of such suppression. The conductive walls of the module profile earlier described with reference to FIG. 1 are shown in the section S—S of the four modules M1–M4 shown in FIG. 9. The two defining walls of two modules M1 and M2 can be short-circuited or choked by means of a sharp U-shaped conductive connection C1, and remaining modules can be short-circuited or choked in a similar manner. In this case, the connection C1 shall be such that the part of connection that extends between the modules in their longitudinal direction shall have a distance d to the opposing defining surface that is equal to a quarter of a wavelength, i.e. $d=\lambda/4$ of the field transmitted by the module. The short-circuit is transformed in this way to an infinitely great impedance for this wavelength and provides effective damping or attenuation of a horizontally polarized field.

The module transmits a periodic field whose frequency is equal to the frequency of the radio frequency used (this frequency being f1 for the module M1). For instance, the distance d will equal 75 mm in the case of the GSM-system, which transmits and receives on 900+/–22.5 MHz. The distance between two mutually adjacent walls, i.e. the length of the connection part C1, is preferably much smaller than one-quarter wavelength.

Disturbances between two modules can also be eliminated by providing a resistive and radio-frequency absorbent material between the modules, as illustrated by the broken line contour A in FIG. 9.

Another method is to provide a circulator on the output of the transmitter element of each module, or to provide one or more ferrite insulations in a known manner.

The aforesaid methods of suppressing the influence of the radio field from one module to one or more mutually adjacent modules can be applied either individually or in combination. It is primarily the antenna unit that leaks radio fields to its neighbours. An antenna unit has a natural leakage of 35–40 dB. A short-circuiting (choke) according to the above results in an attenuation of about 20 dB in the case of a horizontally polarized field. In the case of a vertically polarized field, the leakage is effectively equal to 0. Resistive material provides an attenuation of 25–30 dB and a circulator provides an attenuation of 20–25 dB, whereby an attenuation of 60–100 dB can be achieved, which provides acceptable insulation between two modules.

The aforedescribed radio base structure provides a flexibility which enables traffic capacity to be extended incrementally, while also enabling the allocation of available resources, such as time, frequency and power output, to be effected without obstruction and without limitations in each individual module and in large unit assemblies consisting of several modules. The structure is general and can be implemented for different analog and digital radio systems, i.e. for FDMA, TDMA and CDMA systems. It is also independent of mobile radio standards, i.e. it can be implemented for the Nordic Mobile Telephone System (NMT), the Northamerican Digital Cellular System (ADC), the Pacific Digital Cellular System (PDC) and the Global Mobile Telephone System (GSM).

The independent relation between the modules means that these, apart from being able to operate instantaneously on different frequencies, also are capable to operate according to different modulation schemes.

Consequently, all the modules can operate in TDMA, FDMA or CDMA together, each or mutually in another arbitrary combination. The invention is thus not limited to operation according to a particular modulation scheme.

I claim:

1. A radio module includable in a primary radio station of a mobile radio system for transmitting radio signals on a radio channel comprising:

a main body having a cross-sectional profile forming a first and a second chamber;

an antenna positionable substantially within said first chamber;

a component pack having a transmitter unit and a first connecting means wherein said component pack is positionable substantially within said second chamber and said first connecting means allows a first electrical connection between said transmitter unit and a control unit of said primary radio station;

a second connecting means to allow a fixed second electrical connection directly between said antenna and said component pack;

said transmitter unit and said antenna cooperating so as to transmit first radio signals independently of other radio signals in said radio station during a period only on a first radio channel determined by said control unit.

2. The radio module of claim 1 wherein said antenna comprises a circuit board having a conductor pattern comprising a plurality of individual, mutually connected antenna elements.

3. The radio module of claim 1 wherein said first electrical connection allows transmittal of input signals from said control unit to said transmitter unit.

4. The radio module of claim 1 wherein said second electrical connection allows for direct connection of radio frequency signals between said transmitter and said antenna.

5. The radio module of claim 1 wherein said first and second chambers are formed by a first sidewall in substantially parallel relation with a second sidewall and said first and second sidewalls are separated by a web positioned substantially perpendicular to said first and second sidewalls to form said first and second chambers on opposite sides of said web.

6. The radio module of claim 5 wherein said first and second sidewalls and said web comprise aluminum.

7. The radio module of claim 5 wherein said antenna is retained in position by said first and second sidewalls in said first chamber and said component pack is retained in position by said first and second sidewalls in said second chamber.

8. The radio module of claim 7 wherein said antenna comprises a circuit board having a conductor pattern on one side of said circuit board comprising a plurality of individual, mutually connected antenna elements.

9. The radio module of claim 8 wherein said circuit board is retained in said first chamber with said antenna elements facing said web.

10. The radio module of claim 1 wherein said radio channel comprises a single carrier frequency only.

11. The radio module of claim 1 wherein said radio channel comprises a carrier frequency/time slot.

12. The radio module of claim 1 wherein said radio channel comprises a spread spectrum.

13. A radio base station structure for a primary radio station of a mobile radio system, said primary radio station being able to provide radio communication between said primary station and at least two secondary stations over at least two radio channels, comprising:

a first radio module comprising a first antenna unit connected directly and fixedly to a first transmitter unit to allow radio transmission of a first signal at a selected time only on the first radio channel;

a second radio module comprising a second antenna unit connected directly and fixedly to a second transmitter unit to allow radio transmission of a second signal at the selected time only on the second radio channel wherein said first channel differs from said second channel and said second module is configured in relation to said first module in said base station such that the influence of radio fields between said modules is negligible; and wherein each said radio module further comprises a first conductive sidewall in substantially parallel and spaced relation with a second conductive sidewall and each said antenna and transmitter unit is positioned between said sidewalls and said second sidewall of said first module is positioned adjacent said first sidewall of said second module and said second sidewall of said first module is conductively connected to said first sidewall of said second module to suppress galvanic leakage and the influence of radio fields between radio modules.

14. A radio base station structure for a primary radio station of a mobile radio system, said primary radio station being able to provide radio communication between said primary station and at least two secondary stations over at least two radio channels, comprising:

a first radio module comprising a first antenna unit connected directly and fixedly to a first transmitter unit to allow radio transmission of a first signal at a selected time only on the first radio channel;

a second radio module comprising a second antenna unit connected directly and fixedly to a second transmitter unit to allow radio transmission of a second signal at the selected time only on the second radio channel wherein said first channel differs from said second channel and said second module is configured in relation to said first module in said base station such that the influence of radio fields between said modules is negligible; and wherein each said radio module further comprises a first conductive sidewall in substantially parallel and spaced relation with a second conductive sidewall and each said antenna and transmitter unit is positioned between said sidewalls and said second sidewall of said first module is positioned adjacent said first sidewall of said second module and radiofrequency resistive material is positioned between said second sidewall of said first module and said first sidewall of said second module to suppress galvanic leakage and the influence of radio fields between radio modules.

* * * * *